(12) United States Patent
Wei et al.

(10) Patent No.: US 11,079,284 B2
(45) Date of Patent: Aug. 3, 2021

(54) PLANE SOURCE BLACKBODY

(71) Applicants: Tsinghua University, Beijing (CN); HON HAI PRECISION INDUSTRY CO., LTD., New Taipei (TW)

(72) Inventors: Yang Wei, Beijing (CN); Guang Wang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 407 days.

(21) Appl. No.: 16/244,488

(22) Filed: Jan. 10, 2019

(65) Prior Publication Data

US 2020/0025626 A1 Jan. 23, 2020

(30) Foreign Application Priority Data

Jan. 11, 2018 (CN) .......................... 201810027409.0

(51) Int. Cl.
*G01J 5/00* (2006.01)
*G01J 5/52* (2006.01)

(52) U.S. Cl.
CPC ....... *G01J 5/522* (2013.01); *G01J 2005/0048* (2013.01)

(58) Field of Classification Search
CPC .......... G01J 5/0853; G01J 5/524; G01J 5/522; G01J 2005/0048; G01J 2005/103;
(Continued)

(56) References Cited

U.S. PATENT DOCUMENTS 3,461,250 A * 8/1969 Dehn ..................... B60M 1/302
  191/22 DM
4,516,857 A * 5/1985 Preston .............. G01N 21/3518
  250/343

(Continued)

FOREIGN PATENT DOCUMENTS

CN       2622629      6/2004
CN     101400198      4/2009
(Continued)

OTHER PUBLICATIONS

Lim Zhi Han, Investigation of Laser-Carbon Nanotubes Interaction and Development of CNT-Based Devices, Ph.D Theses, Oct. 12, 2010, Check(https://scholargoogle.com/scholar?as_q=&as_epq=Investigation of Laser-Carbon Nanotubes Interaction and Development of CNT-Based Devices&as_occt=any).

(Continued)

*Primary Examiner* — Gail Kaplan Verbitsky
(74) *Attorney, Agent, or Firm* — ScienbiziP, P.C.

(57) ABSTRACT

The present invention relates to a surface source blackbody. The plane source blackbody comprises a panel, and a plurality of carbon nanotubes. The panel comprises a first surface and a second surface opposite to the first surface. A carbon nanotube array is located on the first surface of the panel. The carbon nanotube array comprises a plurality of carbon nanotubes. The plurality of carbon nanotubes are substantially perpendicular to the first surface of the panel. The carbon nanotube array has a high emissivity, so the plane source blackbody using the carbon nanotube array as a surface material has a high effective emissivity.

20 Claims, 5 Drawing Sheets

(58) Field of Classification Search
CPC ... B82Y 15/00; B82Y 30/00; H01L 21/02601; G01N 21/71
See application file for complete search history.

(56) References Cited

U.S. PATENT DOCUMENTS

| | | | | |
|---|---|---|---|---|
| 4,850,713 | A * | 7/1989 | Thery | G01J 5/12 |
| | | | | 374/30 |
| 8,278,604 | B2 * | 10/2012 | Feng | F24C 7/06 |
| | | | | 219/409 |
| 8,440,485 | B2 * | 5/2013 | Wei | H01L 33/12 |
| | | | | 438/42 |
| 8,568,027 | B2 * | 10/2013 | Ivanov | G01L 1/20 |
| | | | | 374/185 |
| 8,741,422 | B2 | 6/2014 | Miao | |
| 10,386,241 | B1 * | 8/2019 | Staple | G01J 5/026 |
| 2003/0177792 | A1 * | 9/2003 | Longobardo | C03B 29/00 |
| | | | | 65/103 |
| 2008/0192797 | A1 | 8/2008 | Ko et al. | |
| 2009/0085461 | A1 | 4/2009 | Feng et al. | |
| 2009/0096348 | A1 | 4/2009 | Liu et al. | |
| 2009/0321420 | A1 | 12/2009 | Feng et al. | |
| 2011/0108545 | A1 | 5/2011 | Wang et al. | |
| 2011/0217451 | A1 | 9/2011 | Veerasamy | |
| 2011/0315882 | A1 | 12/2011 | Hu et al. | |
| 2012/0104213 | A1 | 5/2012 | Feng et al. | |
| 2012/0312773 | A1 | 12/2012 | Cheng et al. | |
| 2013/0295320 | A1 | 11/2013 | Liu et al. | |
| 2013/0327960 | A1 * | 12/2013 | Zhu | G01J 1/4228 |
| | | | | 250/461.1 |
| 2013/0329213 | A1 * | 12/2013 | Zhu | G01J 1/08 |
| | | | | 356/36 |
| 2014/0217453 | A1 * | 8/2014 | Wei | H01L 33/20 |
| | | | | 257/98 |
| 2015/0367557 | A1 | 12/2015 | Wei et al. | |
| 2017/0258960 | A1 * | 9/2017 | Jin | A61P 19/08 |
| 2019/0194020 | A1 * | 6/2019 | Morihara | B82Y 40/00 |
| 2021/0116305 | A1 * | 4/2021 | LaVeigne | G01J 5/522 |
| 2021/0163294 | A1 * | 6/2021 | Zhang | C09D 7/70 |

FOREIGN PATENT DOCUMENTS

| | | | | |
|---|---|---|---|---|
| CN | 101409961 | | 4/2009 | |
| CN | 102452647 | | 5/2012 | |
| CN | 103382023 | | 11/2013 | |
| CN | 103602132 | | 2/2014 | |
| CN | 105197875 | | 12/2015 | |
| CN | 105562307 | | 5/2016 | |
| CN | 105675143 | | 6/2016 | |
| CN | 107014494 | | 8/2017 | |
| JP | 362100623 | A * | 5/1987 | |
| JP | 2001143854 | A * | 5/2001 | |
| JP | 2014026197 | A * | 2/2014 | ........ C23C 14/221 |
| JP | 2015-203589 | | 11/2015 | |
| JP | 2017-3565 | | 1/2017 | |
| JP | 2017-024942 | | 2/2017 | |
| TW | 200834046 | | 8/2008 | |
| TW | 201125419 | | 7/2011 | |
| TW | 201144217 | | 12/2011 | |
| TW | 201250720 | | 12/2012 | |
| TW | I410615 | | 10/2013 | |
| TW | I486090 | | 5/2015 | |
| TW | 201625937 | | 7/2016 | |
| WO | WO2016098938 A * | | 6/2016 | |
| WO | 2016/107883 | | 7/2016 | |

OTHER PUBLICATIONS

Kohei Mizuno et al., A Black Body Absorber from Vertically Aligned Single-walled Carbon Nanotubes, PNAS, Apr. 14, 2009, 6044-6047, vol. 106, No. 15.

Shimizu et al., Blackbody Thermal Radiator with Vertically Alighned Carbon Nanotube Coating, Japanese Journal of Applied Physics, May 15, 2014, 068004-1~068004-3.

Zhao Jun Han et al., Large-Diameter Single-Walled Carbon Nanotubes, J. Am. Chem. Soc., Mar. 12, 2012, 6018-6024, 134, 13.

Kohei Mizuno et al. A black body absorber from vertically aligned single-walled carbon nanotubes, Proceedings of the Natinal Academy of Sciences, Apr. 14, 2009, vol. 106, 6044-6047.

* cited by examiner

PLANE SOURCE BLACKBODY

CROSS-REFERENCE TO RELATED APPLICATIONS

This application claims all benefits accruing under 35 U.S.C. § 119 from China Patent Application No. 201810027409.0, filed on Jan. 11, 2018, in the China National Intellectual Property Administration, the contents of which are hereby incorporated by reference. This application is related to applications entitled, "BLACKBODY RADIATION SOURCE", filed Ser. No. 16/244,455, "BLACKBODY RADIATION SOURCE", filed Ser. No. 16/244,468, "BLACKBODY RADIATION SOURCE", filed Ser. No. 16/244,474, "BLACKBODY RADIATION SOURCE", filed Ser. No. 16/244,481, "PLANE SOURCE BLACKBODY", filed Ser. No. 16/244,449, "CAVITY BLACKBODY RADIATION SOURCE AND METHOD OF MAKING THE SAME", filed Ser. No. 16/198,549, "CAVITY BLACKBODY RADIATION SOURCE", filed Ser. No. 16/198,565, "CAVITY BLACKBODY RADIATION SOURCE", filed Ser. No. 16/198,577, "CAVITY BLACKBODY RADIATION SOURCE AND METHOD OF MAKING THE SAME", filed Ser. No. 16/198,590, "CAVITY BLACKBODY RADIATION SOURCE AND METHOD OF MAKING THE SAME", filed Ser. No. 16/198,598,and "PLANE SOURCE BLACKBODY", filed Ser. No. 16/198,606.

FIELD

The present disclosure relates to a surface source blackbody.

BACKGROUND

With a rapid development of infrared remote sensing technology, the infrared remote sensing technology is widely used in military fields and civilian fields, such as earth exploration, weather forecasting, and environmental monitoring. Known infrared detectors need to be calibrated by a blackbody before they can be used. The higher an effective emissivity of the blackbody, the higher a calibration accuracy of the infrared detector. Used as a standard radiation source, a role of blackbody is increasingly prominent. The blackbody comprises a cavity blackbody and a plane source blackbody. Wherein, the effective emissivity of the plane source blackbody mainly depends on a surface structure of the plane source blackbody and an emissivity of materials on a surface of the plane source blackbody. Therefore, to obtain plane source blackbody with high performance, it is important to use surface materials with high emissivity.

BRIEF DESCRIPTION OF THE DRAWINGS

Many aspects of the exemplary embodiments can be better understood with reference to the following drawings. The components in the drawings are not necessarily drawn to scale, the emphasis instead being placed upon clearly illustrating the principles of the exemplary embodiments. Moreover, in the drawings, like reference numerals designate corresponding parts throughout the several views.

DETAILED DESCRIPTION

Figure 1:
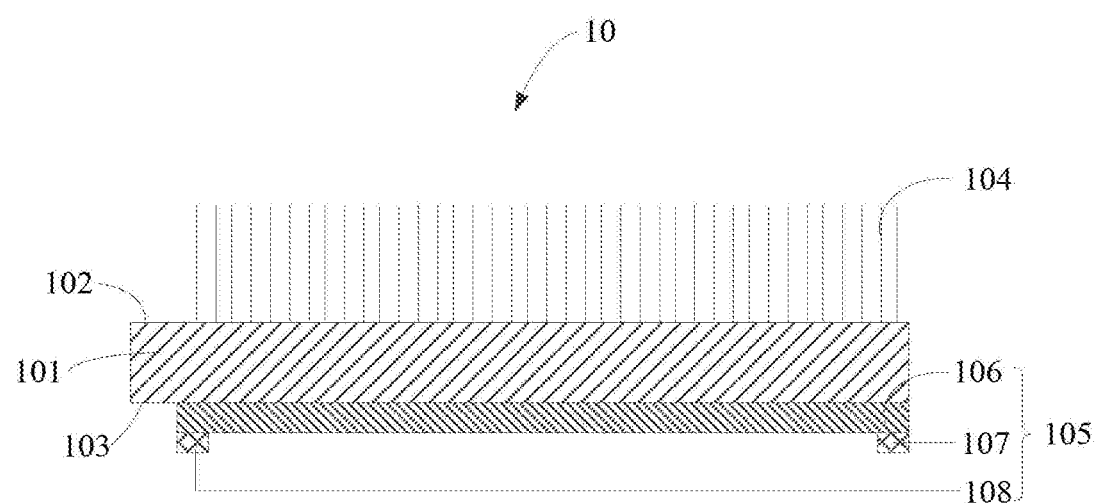
FIG. 1 is a schematic view of a section structure of one embodiment of a surface source blackbody.

The disclosure is illustrated by way of embodiments and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "include," when utilized, means "include, but not necessarily limited to"; it specifically indicates open-ended inclusion or membership in the so-described combination, group, series, and the like.

A plane source blackbody is provided according to the present disclosure. The plane source blackbody comprises a panel, and a carbon nanotube array. The panel comprises a first surface and a second surface opposite to the first surface. The carbon nanotube array is located on the first surface of the panel. The plurality of carbon nanotubes are substantially perpendicular to the first surface.

The panel is made from a material resistant to high temperature and having a high emissivity. The panel can be made from a hard aluminum material, an aluminum alloy material or an oxygen-free copper. In one embodiment, the first surface can be a flat surface. In another embodiment, the first surface can comprise a plurality of grooves.

The carbon nanotube array comprises a bottom surface and a top surface. The bottom surface is in contact with the first surface of the panel, and the top surface is far away from the first surface of the panel. The plurality of carbon nanotubes extend from the bottom surface to the top surface.

Each of the carbon nanotubes comprises a bottom end and a top end, wherein the bottom end is in contact with the first surface of the panel and the top end is far away from the first surface of the panel. In one embodiment, the top ends of the carbon nanotubes are open ends, and the open ends of the carbon nanotubes are not blocked by catalysts particles or something else.

The plane source blackbody can further comprise a heating element. The heating element is placed on the second surface of the panel. In one embodiment, the heating element comprises a carbon nanotube structure, a first electrode and a second electrode. The first electrode and the second electrode are spaced apart from each other on a surface of the carbon nanotube structure. The carbon nanotube structure comprises at least one carbon nanotube film or at least one carbon nanotube long wire. The carbon nanotube structure comprises a plurality of carbon nanotubes joined end to end and substantially oriented along a same direction. The plurality of carbon nanotubes of the carbon nanotube structure extend from the first electrode toward the second electrode.

Because the carbon nanotube structure is placed on the second surface of the panel, after energized by the first electrode and the second electrode, the carbon nanotube structure can heat the whole surface source blackbody. Therefore a temperature field on the first surface of the panel can be evenly distributed, and a temperature stability and uniformity of the plane source blackbody can be improved. Since carbon nanotube has low density and light weight, the plane source blackbody using the carbon nanotube structure as the heating element is light and compact. The carbon nanotube structure has low electrical resistance, high electrothermal conversion efficiency and low thermal resistivity. So using the carbon nanotube structure to heat the plane source blackbody has the characteristics of rapid temperature rise, small thermal hysteresis and fast heat exchange rate. Carbon nanotube materials have excellent toughness, thus the plane source blackbody using the carbon nanotube structure as the heating element has a long service life.

Referring to the FIG. 1, a plane source blackbody 10 is provided according to one embodiment. The plane source blackbody 10 comprises a panel 101. The panel 101 comprises a first surface 102 and a second surface 103 opposite to the first surface 102. A carbon nanotube array 104 are located on the first surface 102 of the panel 101. The carbon nanotube array 104 comprises a plurality of carbon nanotubes, and the plurality of carbon nanotubes are substantially perpendicular to the first surface 102 of the panel 101.

The panel 101 is made from an aluminum alloy material. The first surface 102 is a flat surface. The top end of each carbon nanotube is an open end. The plane source blackbody 10 further comprises a heating element 105 located on the second surface 103 of the panel 101. The heating element 105 comprises a carbon nanotube structure 106, a first electrode 107 and a second electrode 108.

A method for making the plane source blackbody 10 is provided in one embodiment. The method comprises the following steps:

S11, providing a panel 101, wherein the panel 101 comprises a first surface 102 and a second surface 103 opposite to the first surface 102;

S12, placing a carbon nanotube array 104 on the first surface 102 of the panel 101, wherein the carbon nanotube array 104 comprises a plurality of carbon nanotubes, and the plurality of carbon nanotubes are substantially perpendicular to the first surface 102 of the panel 101.

In the step S11, the panel 101 is made from an aluminum alloy material.

The first surface 102 of the panel 101 is a flat surface.

In the step S12, the carbon nanotube array 105 can be placed on the first surface 102 of the panel 101 by a method of direct growth or a method of transfer. The two methods are described respectively in the followings:

The method of direct growth, that is, growing a carbon nanotube array 105 on the first surface 102 of the panel 101 directly, comprises the following steps: (1) depositing a catalyst on the first surface 102 of the panel 101; (2) heating the panel 101 to a growth temperature of a carbon nanotube array under an atmosphere of a protective gas, and then growing the carbon nanotube array 105 on the first surface 102 of the panel 101 under an atmosphere of a carbon source gas.

In the step (1), a catalyst can be deposited on the first surface 102 by a method of electron beam evaporation, magnetron sputtering, and thermal deposition. The catalyst may be iron (Fe), cobalt (Co), nickel (Ni) or alloys of those metals mentioned above. A thickness of the catalyst is in a range from about 1 nanometer to about 10 nanometers. In one embodiment, the thickness of the catalyst is in a range from about 1 nanometer to about 5 nanometers.

In the step (2), the panel 101 is put into a reaction furnace and is heated to a temperature in a range from about 500 to about 900° C. under the atmosphere of the protective gas, and in one embodiment, the temperature is in a range from about 600 to about 720° C. Then, a mixed gas of the carbon source gas and the protective gas is introduced into the reaction furnace. The carbon source gas can be acetylene, ethylene, methane, ethane. The protective gas comprises inert gas or nitrogen. The heating time ranges from about 10 minutes to about 40 minutes.

The carbon nanotube array 105 can be further treated to make top ends of the plurality of carbon nanotubes of the carbon nanotube array open. The method for treating the carbon nanotube array is not limited. In one embodiment, the treating method comprises: using a laser beam to cut the plurality of carbon nanotubes to open the top ends.

The method of transfer, that is, growing a carbon nanotube array 105 on a surface of a substrate and then transferring the carbon nanotube array 105 to the first surface 102 of the panel 101, comprises the following steps: (a) providing a substrate, wherein a carbon nanotube array 105 is grown on a surface of the substrate; (b) transferring the carbon nanotube array 105 to the first surface 102 of the panel 101.

In the step (a), the carbon nanotube array 105 comprises a plurality of carbon nanotubes. The ends of the plurality of carbon nanotubes adjacent to the substrate are defined as growth ends, and the ends of the plurality of carbon nanotubes far away from the substrate are defined as top ends.

In the step (b), the first surface 102 of the panel 101 is in contact with the top ends of the plurality of carbon nanotubes. The second surface 103 of the panel 101 is pressed slightly, and then the substrate is separated from the panel 101 leaving the plurality of carbon nanotubes on the panel 101. Thereby, the carbon nanotube array 105 can be transferred to the first surface 102 of the panel 101.

In one embodiment, a layer of binder can be formed on the first surface 102 of the panel 101 or the top ends of the plurality of carbon nanotubes of the carbon nanotube array 105 in advance. Thus, a bonding force between the first surface 102 of the panel 101 and the top ends of the plurality of carbon nanotubes can be enhanced, and the carbon nanotube array 105 can be tightly fixed on the first surface 102 of the panel 101. A thickness of the binder is in a range from about 1 nanometer to about 50 micrometers, and in one embodiment the thickness of the binder is in a range from about 1 micrometer to about 10 micrometers. The binder can be a conventional binder, and the binder can be a solid, liquid or solid-liquid mixed slurry or viscose.

In the process of transferring the carbon nanotube array 105 to the first surface 102 of the panel 101, the top ends of the plurality of carbon nanotubes of the carbon nanotube array 105 are in contact with the first surface 102 of the panel 101, and the growth ends of the plurality of carbon nanotubes of the carbon nanotube array 105 are separated from the substrate and open.

In one embodiment, the method further comprises putting a heating element 105 on the second surface 103 of the panel 101, thus the plane source blackbody 10 can be heated in real time.

Figure 2:
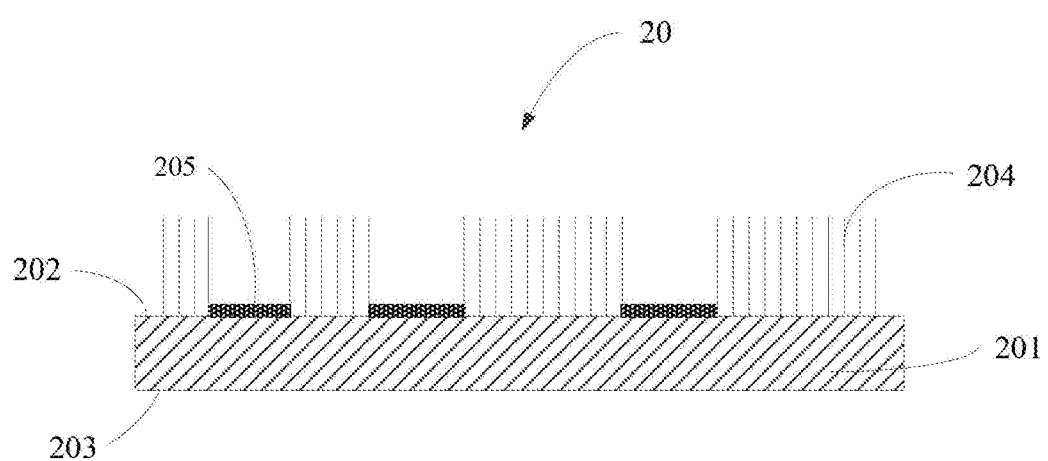
FIG. 2 is a schematic view of a cross-sectional structure of one embodiment of a surface source blackbody.

Referring to the FIG. 2, a plane source blackbody 20 is provided according to one embodiment. The plane source blackbody 20 comprises a panel 201. The panel 201 comprises a first surface 202 and a second surface 203 opposite to the first surface 202. A carbon nanotube array 204 are located on the first surface 202 of the panel 201. The carbon nanotube array 204 comprises a plurality of carbon nanotubes, and the plurality of carbon nanotubes are substantially perpendicular to the first surface 202 of the panel 201. The carbon nanotube array 204 is a patterned structure.

By "patterned", it means that the first surface 202 of the panel 201 is partially covered by the carbon nanotube array 204. A shape and position of the pattern are not limited. The first surface 202 of the panel 201 which is not covered by the carbon nanotube array 204 is covered by a black coating 205. A ratio between a area of the first surface 202 which is covered by the carbon nanotube array 204 and a area of the first surface 202 which is covered by the black coating 205 can range from about 1:9 to 9:1.

The black coating 205 can be a black lacquer, a black lacquer mixed with carbon nanotubes, or a carbon nanotube layer structure. The black lacquer has high emissivity, such as Pyromark 1200 black lacquer having an emissivity of 0.92, Nextel Velvet 811-21 black lacquer having an emissivity of 0.95, etc. A weight percentage of carbon nanotubes in the black lacquer mixed with carbon nanotubes can be in a range from about 1% to about 50%. The carbon nanotube layer structure comprises a plurality of carbon nanotubes extending along a direction substantially parallel to a surface of the carbon nanotube layer structure. The carbon nanotube layer structure comprises at least one carbon nanotube film, at least one carbon nanotube wire, or a combination thereof. Further, the carbon nanotube layer structure comprises a plurality of micropores.

The panel 201 is made from an oxygen-free copper. The first surface 202 is a flat surface.

A method for making the plane source blackbody 20 is provided in one embodiment. The method comprises the following steps:

S21, providing a panel 201, wherein the panel 201 comprises a first surface 202 and a second surface 203 opposite to the first surface 202, and the first surface 202 of the panel 201 is divided into a first area and a second area;

S22, forming a patterned carbon nanotube array 204 on the first area of the first surface 202, wherein the patterned carbon nanotube array 204 comprises a plurality of carbon nanotubes, and the plurality of carbon nanotubes are substantially perpendicular to the first surface 202 of the panel 201;

S23, forming a black coating 205 on the second area of the first surface 202.

In the step S21, the panel 201 is made from an oxygen-free copper. The first surface 202 is a flat surface. The first surface 202 of the panel 201 is divided into the first area and the second area according to a predetermined pattern. The carbon nanotube array 204 are located on the first area, and the black coating 205 is located on the second area.

In the step S22, the carbon nanotube array 204 can be placed on the first surface 202 of the panel 201 by the method of direct growth or the method of transfer. A specific operation method of the step S22 is the same as that of the step S12, and will not be described in detail here. When the method of direct growth is adopted, a mask can be used to cover the second area, thus the carbon nanotubes can be only grown on the first area.

In the step S23, The black coating 205 can be a black lacquer, a black lacquer mixed with carbon nanotubes, or a carbon nanotube layer structure. The black lacquer has high emissivity, such as Pyromark 1200 black lacquer having an emissivity of 0.92, Nextel Velvet 811-21 black lacquer having an emissivity of 0.95, etc. A weight percentage of carbon nanotubes in the black lacquer mixed with carbon nanotubes can be in a range from about 1% to about 50%. The carbon nanotube layer structure comprises a plurality of carbon nanotubes extending along a direction substantially parallel to a surface of the carbon nanotube layer structure.

Figure 3:
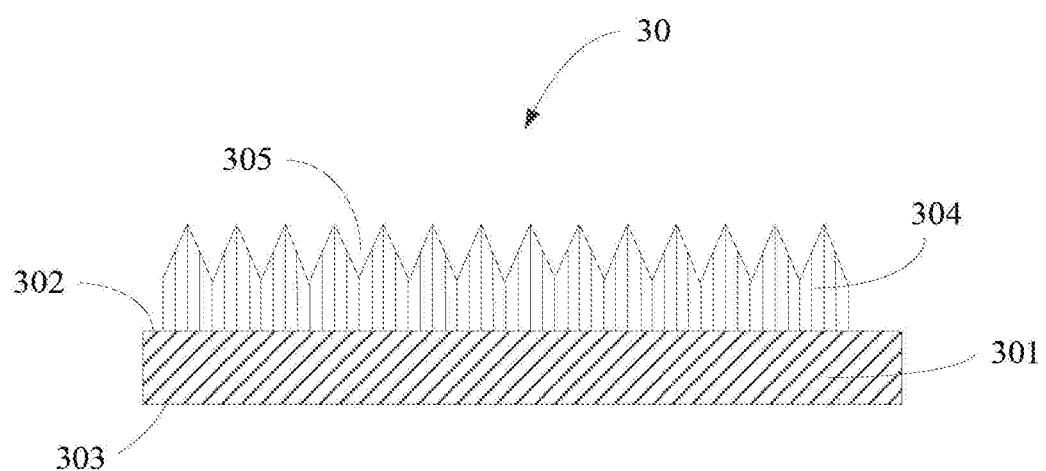
FIG. 3 is a schematic view of a cross-sectional structure of one embodiment of a surface source blackbody.

Referring to the FIG. 3, a plane source blackbody 30 is provided in one embodiment. The plane source blackbody 30 comprises a panel 301. The panel 301 comprises a first surface 302 and a second surface 303 opposite to the first surface 302. Wherein, a carbon nanotube array 304 is located on the first surface 302 of the panel 301. The carbon nanotube array 304 comprises a plurality of carbon nanotubes, and the plurality of carbon nanotubes are substantially perpendicular to the first surface 302 of the panel 301. The carbon nanotube array 304 comprises a top surface and a bottom surface opposite to the top surface. The top surface of the carbon nanotube array 304 is far away from the first surface 302 of the panel 301. A plurality of microstructures are formed on the top surface of the plurality of carbon nanotubes.

In one embodiment, the plurality of microstructures comprise a plurality of micro-grooves 305 formed on the top surface of the carbon nanotube array 304. Each of the micro-grooves can be an annular micro-groove, a strip micro-groove, or a dot-shaped micro-groove. The plurality of micro-grooves 305 form concentric circular patterns, stripped patterns, or dotted patterns on the top surface of the carbon nanotube array 304. Cross-sectional shapes of the micro-grooves are not limited, and can be inverted triangles, rectangles, or trapezoids.

It is indicated by existing research that the larger the surface roughness of the panel of the surface source blackbody, the higher the emissivity of the surface source blackbody. In the present disclosure, the plurality of microstructures formed on the top surface of the carbon nanotube array 304 is equivalent to an increase of the surface roughness of the panel 301 of the plane source blackbody 30, therefore the emissivity of the plane source blackbody 30 can be further increased.

The panel 301 is made from an aluminum alloy material. The first surface 302 is a flat surface.

A method for making the plane source blackbody 30 is provided in one embodiment. The method comprises the following steps:

S31, providing a panel 301, wherein the panel 301 comprises a first surface 302 and a second surface 303 opposite to the first surface 302;

S32, placing a carbon nanotube array 304 on the first surface 302, wherein the carbon nanotube array 304 comprises a plurality of carbon nanotubes, and the plurality of carbon nanotubes are substantially perpendicular to the first surface 302 of the panel 301;

S33, forming a plurality of microstructures on a top surface of the carbon nanotube array 304 away from the first surface 302 of the panel 301.

A specific operation method of the step S31 and S32 is the same as that of the step S11 and S12 respectively, and will not be described in detail here.

In the step S33, a laser generator is provided to generate a laser beam. The laser beam is used to irradiate the top surface of the carbon nanotube array 304 to form a plurality of microstructures. A direction in which the laser beam is incident can be at an angle to the top surface of the carbon nanotube array 304. In one embodiment, the angle ranges from about 55 degrees to about 90 degrees.

During the process of laser irradiation, since a high energy of the laser beam can be absorbed by carbon nanotubes which are on the paths of the laser beams, the temperature of the carbon nanotubes become high and the carbon nanotubes can react with the oxygen in the air, and then decompose. Thus, the carbon nanotubes on the paths of the laser beams will be removed. In this way, a plurality of microgrooves 305 with predetermined depth and width can be formed on the top surface of the carbon nanotube array 304. A scanning path of the laser beam can be set precisely by a computer in advance to form a complex etched pattern on the top surface of the carbon nanotube array 304.

Figure 4:
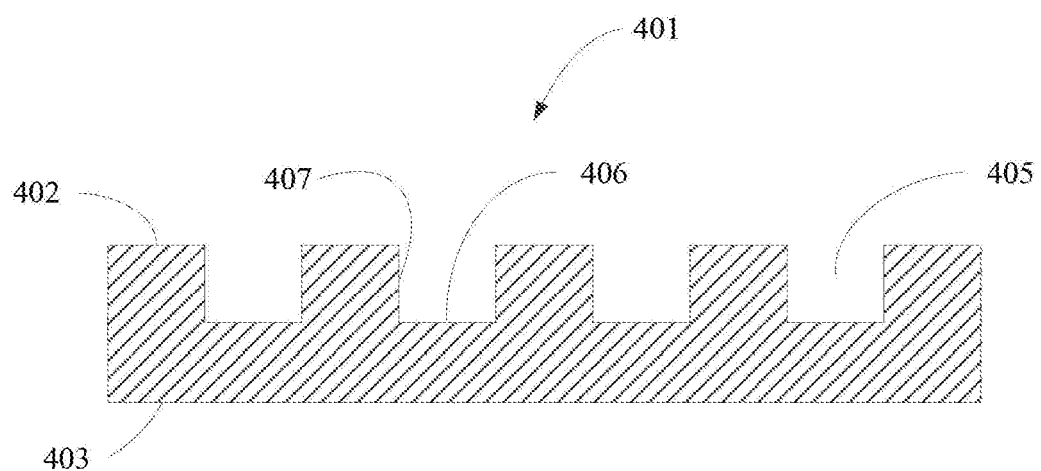
FIG. 4 is a schematic view of a cross-sectional structure of one embodiment of a panel.
Figure 5:
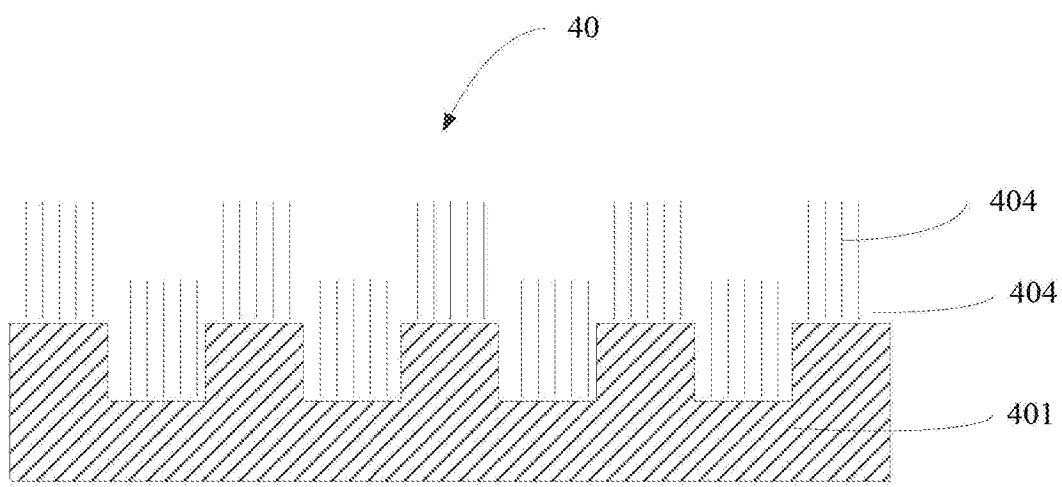
FIG. 5 is a schematic view of a cross-sectional structure of a plane source blackbody using the panel in FIG. 4.

Referring to the FIG. 4 and FIG. 5, a plane source blackbody 40 is provided in one embodiment. The plane source blackbody 40 comprises a panel 401. The panel 401 comprises a first surface 402 and a second surface 403 opposite to the first surface 402. A carbon nanotube array 404 are formed on the first surface 402 of the panel 401. The carbon nanotube array 404 comprises a plurality of carbon nanotubes, and the plurality of carbon nanotubes are substantially perpendicular to the first surface 402 of the panel 401.

The panel 401 is made from a hard aluminum material. The first surface 402 comprises a plurality of grooves 405 spaced apart from each other.

The plurality of grooves 405 are arranged in a matrix manner. Each of the grooves 405 can be a strip groove, an annular groove, or a dot-shaped groove. Cross-sectional shapes of the grooves 405 can be rectangles or trapezoids. The grooves 405 can be formed via a method of casting or etching the panel 401. In one embodiment, the grooves 405 are strip grooves, and the cross-sectional shapes of the grooves 405 are rectangles.

Each of the grooves 405 comprise a bottom surface 406. The bottom surface 406 is a flat surface. The carbon nanotube array 404 can be located on both the bottom surface 406 of each of the grooves 405 and the first surface 402 of the panel 401 simultaneously.

A method for making the plane source blackbody 40 is provided in one embodiment. The method comprises the following steps:

S41, providing a panel 401, wherein the panel 401 comprises a first surface 402 and a second surface 403, and the first surface 402 comprises a plurality of grooves 405 spaced apart from each other;

S42, placing a plurality of carbon nanotubes on both a bottom surface 406 of each of the grooves 405 and the first surface 402 of the panel 401, wherein the plurality of carbon nanotubes are substantially perpendicular to the first surface 402 of the panel 401.

In the step S41, the grooves 405 are strip grooves. Cross-sectional shapes of the grooves 405 are rectangles.

In the step S42, the plurality of carbon nanotubes can be placed on the bottom surface 406 of each of the grooves 405 and the first surface 402 of the panel 401 by a method of direct growth or a method of transfer.

The method of direct growth comprises: depositing a catalyst on the bottom surface 406 of each of the grooves 405 and the first surface 402 of the panel 401 respectively; heating the panel 401 to a growth temperature of a carbon nanotube array under an atmosphere of a protective gas, and then growing a first carbon nanotube array and a second carbon nanotube array under an atmosphere of a carbon source gas, wherein the first carbon nanotube array is grown on the bottom surface 406 of the grooves 405 and the second carbon nanotube array is grown on the first surface 402 of the panel 401.

The method of transfer comprises: providing a substrate, wherein a surface of the substrate comprises a plurality of protrusions spaced apart from each other, a shape, a size and positions of the protrusion are correspondingly designed to match the shape, the size and positions of the grooves on the first surface 402 of the panel 401 respectively, and a plurality of carbon nanotubes are respectively grown on a top surface of the protrusion and the surface of the substrate, and the plurality of carbon nanotubes are substantially perpendicular to the surface of the substrate; transferring the plurality of carbon nanotubes on the top surface of the protrusion to the bottom surface of each groove and transferring the plurality of carbon nanotubes on the surface of the substrate to the first surface 402 of the panel 401.

The plane source blackbody provided by the present disclosure has the following characteristics:

Firstly, carbon nanotubes are currently the blackest material in the world. Tiny gaps between carbon nanotubes in a carbon nanotube array can prevent an incident light from being reflected off a surface of the array, so the emissivity of the carbon nanotube array is high. The emissivity of the carbon nanotube array is as high as 99.6% according to a measurement, which is far larger than known inner surface materials of the blackbody cavity. For example, the emissivity of Nextel Velvet 81-21 black lacquer is 96%.

Secondly, the carbon nanotubes can be prepared conveniently and quickly by a chemical vapor deposition of carbon source gas under high temperature conditions, and the raw materials are cheap and easy to obtain.

Thirdly, the carbon nanotubes have excellent thermal conductivity. So it can improve the temperature uniformity and stability of the plane source blackbody to use the carbon nanotube array as the surface material of the plane source blackbody.

Fourthly, the carbon nanotubes have excellent mechanical properties, so the plane source blackbody using carbon nanotubes will have good stability and may not be easily damaged in harsh environment.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A plane source blackbody comprising:
   a panel comprising a first surface and a second surface opposite to the first surface;
   a carbon nanotube array on the first surface of the panel, wherein the carbon nanotube array comprises a plurality of carbon nanotubes, the plurality of carbon nanotubes are substantially perpendicular to the first surface of the panel, and the carbon nanotube array has a high emissivity, so the plane source blackbody using the carbon nanotube array as a surface material has a high effective emissivity; and the first surface of the panel is partially covered by the carbon nanotube array, the first surface of the panel which is not covered by the carbon nanotube array is covered by a black coating.

2. The plane source blackbody of claim 1, wherein each of the carbon nanotubes comprises a top end, the top end is far away from the first surface of the panel, and the top end is an open end.

3. The plane source blackbody of claim 1, wherein the black coating is a black lacquer, a black lacquer mixed with carbon nanotubes, or a carbon nanotube layer structure.

4. The plane source blackbody of claim 3, wherein a weight percentage of carbon nanotubes in the black lacquer mixed with carbon nanotubes is in a range from 1% to 50%.

5. The plane source blackbody of claim 3, wherein the carbon nanotube layer structure comprises a plurality of carbon nanotubes extending along a direction substantially parallel to a surface of the carbon nanotube layer structure.

6. The plane source blackbody of claim 1, wherein a ratio between a area of the first surface of the panel covered by the carbon nanotube array and a area of the first surface of the panel covered by the black coating ranges from 1:9 to 9:1.

7. The plane source blackbody of claim 1, wherein a plurality of micro-grooves are formed on a surface of the carbon nanotube array away from the first surface of the panel.

8. The plane source blackbody of claim 7, wherein each of the micro-grooves is an annular micro-groove, a strip micro-groove, or a dot-shaped micro-groove.

9. The plane source blackbody of claim 7, wherein cross-sectional shapes of the micro-grooves are inverted triangles, rectangles, or trapezoids.

10. The plane source blackbody of claim 1, wherein the plane source blackbody further comprises a heating element on the second surface of the panel.

11. The plane source blackbody of claim 10, wherein the heating element comprises a carbon nanotube structure, a first electrode and a second electrode, and the first electrode and the second electrode are spaced apart from each other on a surface of the carbon nanotube structure.

12. The plane source blackbody of claim 11, wherein the carbon nanotube structure comprises a plurality of carbon nanotubes joined end to end and substantially oriented along a same direction, and the plurality of carbon nanotubes of the carbon nanotube structure extend from the first electrode towards the second electrode.

13. The plane source blackbody of claim 1, wherein the first surface is a flat surface.

14. The plane source blackbody of claim 1, wherein the first surface of the panel comprises a plurality of grooves.

15. The plane source blackbody of claim 14, wherein each of the grooves is an annular groove, a strip groove, or a dot-shaped groove.

16. The plane source blackbody of claim 14, wherein cross-sectional shapes of the grooves are rectangles or trapezoids.

17. The plane source blackbody of claim 14, wherein the plurality of carbon nanotubes are on a bottom surface of each of the grooves.

18. A plane source blackbody, comprising:
    a panel comprising a first surface and a second surface opposite to the first surface, wherein the first surface comprises a first portion and a second portion;
    a carbon nanotube array on the first portion, wherein the carbon nanotube array comprises a plurality of carbon nanotubes substantially perpendicular to the first surface; and
    a black coating on the second portion.

19. The plane source blackbody of claim 18, wherein the black coating is a black lacquer, a black lacquer mixed with carbon nanotubes, or a carbon nanotube layer structure.

20. The plane source blackbody of claim 19 wherein a weight percentage of carbon nanotubes in the black lacquer mixed with carbon nanotubes is in a range from 1% to 50%.

* * * * *